Dec. 9, 1930.　　　D. W. DOUGLAS　　　1,784,784
AMPHIBIAN PLANE
Filed April 23, 1927　　　3 Sheets-Sheet 1
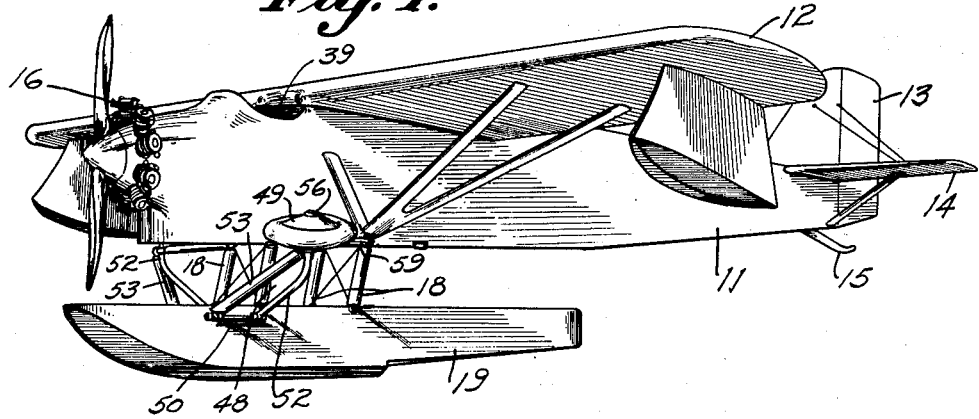
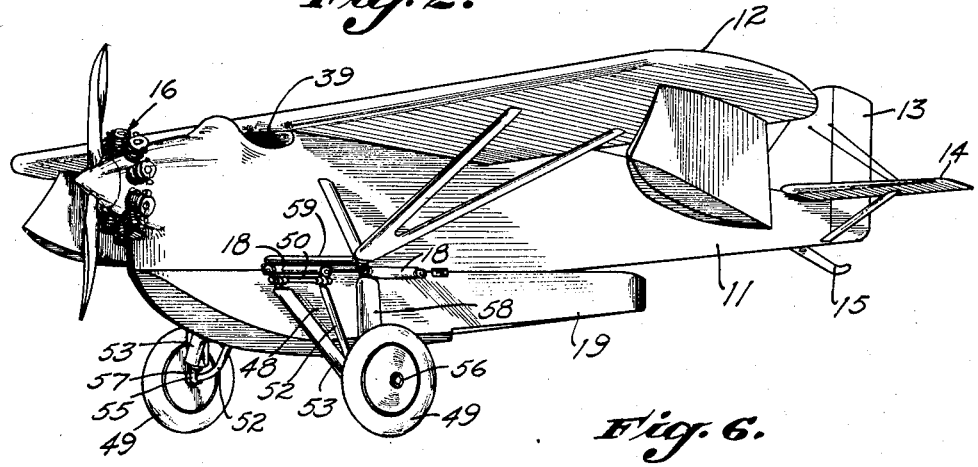
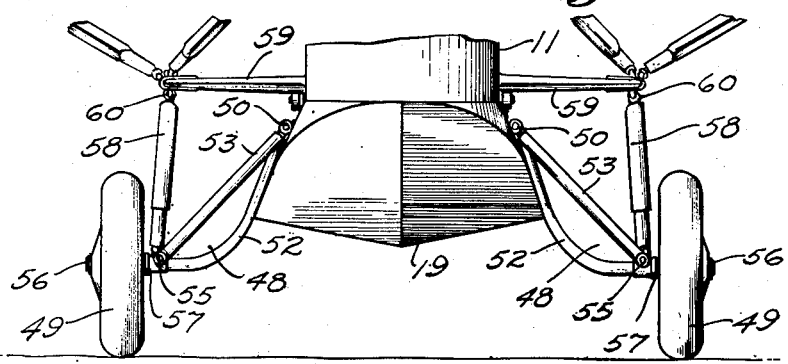
INVENTOR.
DONALD WILLS DOUGLAS
BY
ATTORNEY.

Dec. 9, 1930.                D. W. DOUGLAS                1,784,784
                            AMPHIBIAN PLANE
                         Filed April 23, 1927          3 Sheets-Sheet 2

INVENTOR:
DONALD WILLS DOUGLAS
BY
ATTORNEY.

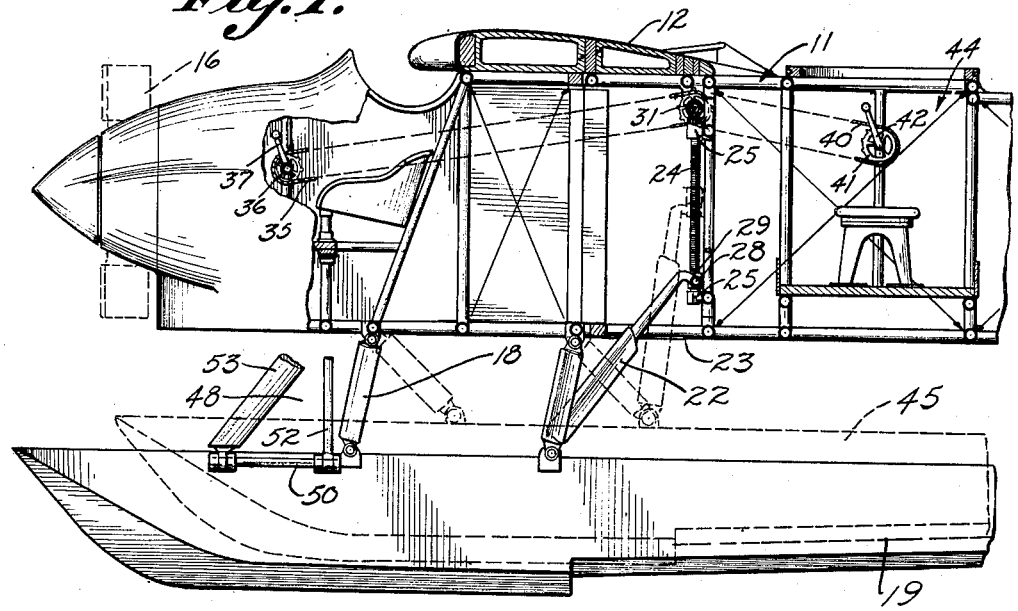
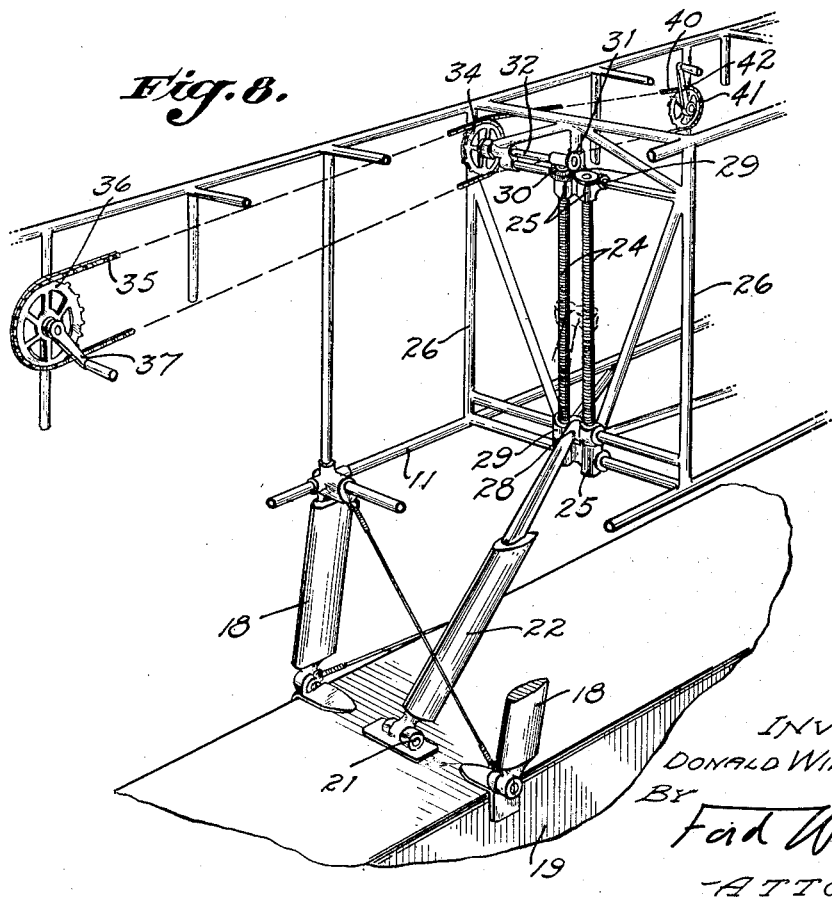

Patented Dec. 9, 1930

1,784,784

UNITED STATES PATENT OFFICE

DONALD WILLS DOUGLAS, OF SANTA MONICA, CALIFORNIA, ASSIGNOR, BY MESNE ASSIGNMENTS, TO DOUGLAS AIRCRAFT COMPANY, INC., OF LOS ANGELES, CALIFORNIA, A CORPORATION OF DELAWARE

AMPHIBIAN PLANE

Application filed April 23, 1927. Serial No. 186,006.

My invention relates to airplanes. In the development of naval facilities, carrier-ships have been brought into use which carry airplanes and serve as a take-off and landing place for these airplanes. At present the airplanes carried by the carrier-ships are land-planes, being provided with wheels as landing-gear. There is a certain degree of danger connected with the flying of a land-plane over the water in view of the fact that such a plane cannot land on the water. In view of this danger the airplanes are confined within a limited area around the carrier-ship.

It is an object of this invention to provide an airplane which may be converted from a land-plane into a seaplane. My invention is very useful in connection carrier-ships since, when the airplane leaves the carrier-ship, it may be converted into seaplane so that in case of necessity it may land upon the water without danger of sinking.

A further object of this invention is to provide an airplane of this character in which the converting mechanism may be easily operated.

A still further object of this invention is to provide an airplane of the character mentioned in which the wheels or the pontoon are properly positioned with respect to the center of gravity of the airplane.

Another object is to provide in an airplane of the above class a water landing-gear and a land landing-gear which are connected by a novel mechanism for automatically moving one of the landing-gears into alighting position when the other landing-gear is in retracted position.

Other objects and advantages of the invention will be made evident hereinafter.

Referring to the drawings:

Fig. 1 is a perspective view showing an airplane of my invention with the pontoon in alighting position and the wheels in retracted position.

Fig. 2 is a perspective view similar to Fig. 1 but showing the wheels in alighting position and the pontoon in retracted position.

Fig. 6 is a front elevation of Fig. 4.

Fig. 7 is a side view partly sectioned showing the mechanism for moving the pontoon and wheels into and from alighting position.

Fig. 8 is a perspective view showing the mechanism for moving the pontoon and wheels into and from alighting position.

Figure 3:
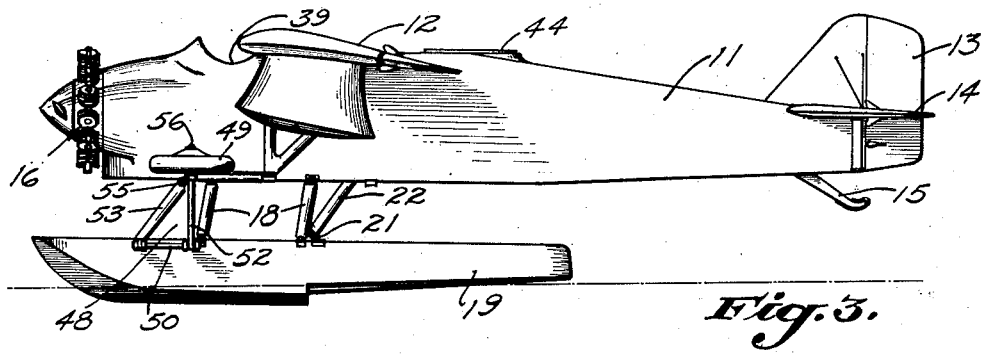
Figs. 3 and 4 are side elevations corresponding to Figs. 1 and 2.

Referring to the drawings and particularly Figs. 1 to 4, the airplane has a fuselage 11, airfoils 12, a rudder 13, an elevator 14, a tail-skid 15, and a propeller and motor 16. The parts just mentioned may be of any desirable design which is not important to this invention. These parts just enumerated will be referred to in the appended claims as the main structure of the airplane.

Figure 4:
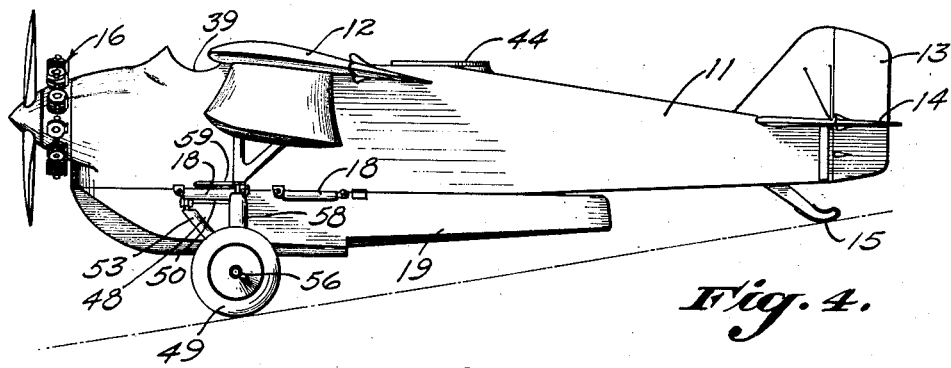
Figure 5:
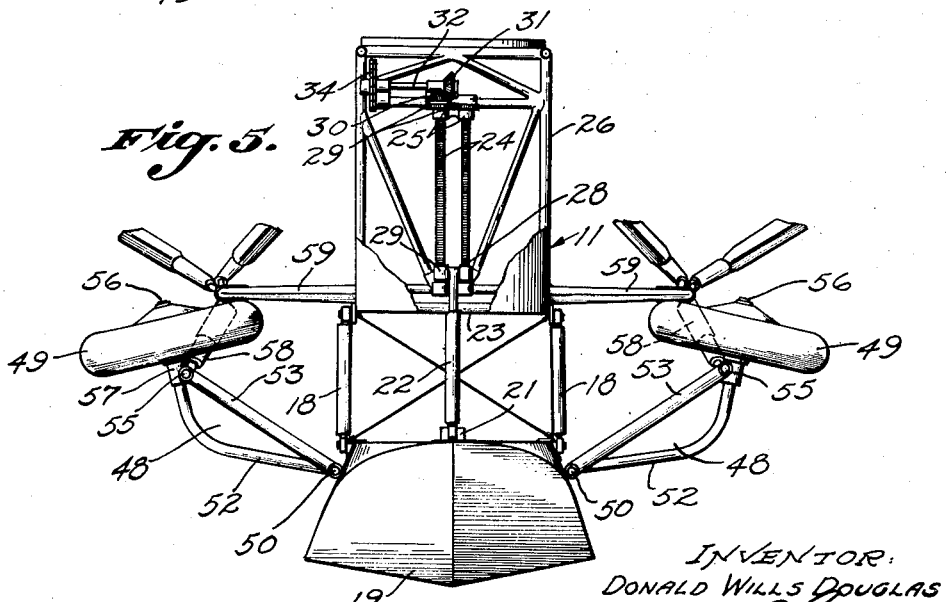
Fig. 5 is a front view of Fig. 3 partly sectioned to show the mechanism for moving the pontoon from and into alighting position.

Referring particularly to Figs. 5, 7 and 8, pontoon-carriers 18 are pivotally connected to the lower part of the fuselage 11 and are adapted to extend downward therefrom. These pontoon-carriers are arranged in pairs as shown and may swing from the position shown in Figs. 1, 3, 5, 7, and 8 into positions shown in Figs. 2, 4 and 6. Provided below the fuselage 11 is a pontoon 19 which is the water landing-gear of the invention. The pontoon 19 has the lower ends of the pontoon-carriers 18 pivotally secured thereto. The pontoon 19 is adapted to swing from an alighting position, as illustrated in Figs. 1, 3, 5, 7, and 8, into a retracted position against the fuselage 11, as illustrated in Figs. 2, 4, and 6.

Mechanism for moving the pontoon between these positions is illustrated best in Figs. 5, 7, and 8. Pivoted at 21 to the upper part of the pontoon 19 between the rear pontoon-carriers 18 is an arm 22. This arm 22 extends through a narrow opening 23 (Fig. 7) to the interior of the fuselage 11. Mounted inside the fuselage 11 is a pair of vertical lead-screws 24 which are supported by bearings 25, these bearings 25 being secured to a seamless-tubing frame 26 of the fuselage 11. The upper end of the arm 22 is pivoted at 28 to a nut 29 having portions which surround the lead-screws 24. The two lead-screws 24 are drivably connected together at their upper ends by gears 29 so that they rotate in opposite directions. The lead-screws 24 are, therefore, provided with right and left-hand threads and so are the portions of the nut 29. At the upper end of one of the lead-screws 24 is a beveled gear 30 which is engaged by a beveled gear 31 mounted on a drive shaft 32. The drive shaft 32 extends horizontally, and an end thereof adjacent to the side of the fuselage 11 is provided with a pair of sprocket wheels 34. Extended around one of the sprocket wheels 34 is a front sprocket chain 35 which extends around a front sprocket 36, which front sprocket 36 is provided with an operating crank 37. As illustrated in Fig. 7 the front sprocket 36 is placed in a pilot's cock-pit 39 of the fuselage and may be operated by the pilot of the airplane. Extended around the other of the sprockets 34 is a rear sprocket chain 40 which extends around a rear sprocket 41 having an operating crank 42. As illustrated in Fig. 7 the rear sprocket 41 is situated in an observer's cock-pit 44 of the airplane and may be operated by the observer. It will be seen that by revolving either of the cranks 37 or 42, the lead-screws 24 may be moved so as to raise or lower the upper end of the arm 22. When the upper end of the arm 22 is raised, the pontoon 19 is moved from alighting position through a position indicated by dotted lines 45 of Fig. 7 into retracted position; and when the upper end of the arm 22 is lowered, the pontoon will be returned to alighting position.

Pivotally connected to the pontoon 19 on opposite sides thereof are frames 48 which carry wheels 49 which are the land landing-gear referred to in the appended claims. As shown in the various views of the drawings the pontoon 19 has shafts 50 connected to the opposite sides thereof and extending parallel to the direction of flight of the airplane. The frames 48 each have an axle-member 52 and a strut-member 53. The axle-members are pivoted to the rear ends of the shafts 50, and the strut-members 53 are pivoted to the front ends of these shafts 50. The outer ends of the strut-members and axle members of the separate frames 48 are secured together as indicated at 55. The axle-members 52 are curved near their central part so that outer ends 56 thereof extend beyond the outer ends of the strut-member 53 to suitably receive the wheels 49. Pivotally secured to fixtures 57, provided where the axle-members and strut-members meet, are thrust-members 58. The fuselage 11 is provided with rigid arms 59 which extend outward from the opposite sides thereof. The upper ends of the thrust-members 58 are connected to these rigid arms 59 by suitable universal joints 60. The thrust-members 58 are in the nature of struts, taking the thrust of the wheels 49. It is therefore desirable to include suitable shock absorbers in the thrust-members 58.

The wheels 49 which comprise the land landing-gear of the invention are so connected to the pontoon by the frames 48 and to the main structure by the thrust-members 58 that they are automatically moved into retracted position when the pontoon is moved into alighting position; and they are automatically moved into alighting position when the pontoon is moved into retracted position. To illustrate the manner in which this takes place, let us first refer to Figs. 1, 3 and 5 in which the pontoon is shown in alighting position and the wheels are shown in retracted position. At this time the frames 48 are extending diagonally upward and the thrust-members 58 are extending in substantially a horizontal plane. As the pontoon is moved into retracted position the entire main frames 48 and the wheels 49 move in a horizontal direction or in a direction substantially parallel to the line of flight a distance equal to the horizontal movement of the pontoon 19. As the frames 48 move rearward with the pontoon, the inner ends thereof which are secured to the pontoon are moved upward a distance equal to the upward movement of the pontoon. The outer ends of the frames 48, however, are moved downward. When the frames 48 are moved rearward, the outer ends thereof must swing around the points of attachment of the thrust-members 58 to the rigid arms 59. The thrust-members 58, as will be obvious from an inspection of the drawings, cause the outer ends of the frames 48 to move downward a distance substantially equal to the length of the thrust-members and into alighting position as shown in Figs. 2, 4 and 6 of the drawings.

When the pontoon 19 is moved in the reverse direction or into alighting position, it is moved not only downward, but also in a direction parallel to the axis of the shaft 50. This increases the distance between the shafts 50 and the universal joints 60 and is equivalent to elongating one side of a triangle formed by the shaft 50, the pivot 55 and the universal joint 60, with the result that the pivot 55 attempts to assume a position intermediate the shaft 50 and universal joint 60. Since the universal joint 60 is positioned above the shaft 50, the pivot 55 moves to a position below the universal joint 60 and above the pivot 55, thus moving the wheels 49 above the pontoon 19.

It will be noted that when the pontoon is moved into alighting position it is extended forward from the fuselage so that the front end thereof extends below the propeller of the airplane. This is done so that the pontoon will occupy a proper position with respect to the center of gravity of the airplane and so that the pontoon may properly support the airplane on the surface of the water. The wheels 49 are so positioned that they also occupy a proper position with respect to the center of gravity with the airplane when they are in alighting position.

From the foregoing description the important features of this invention will be evident. The airplane equipped with this invention may be used either on land or water without danger to the fliers.

A very important feature, and the essence of the invention, is the mechanism by which the water landing-gear or the pontoon may be moved into and from alighting position and the land landing-gear or the wheels simultaneously moved into and from retracted position.

The mechanism is designed so that it may be operated either by the pilot or the observer with equal facility.

In the foregoing description I have shown but a single embodiment of the invention. It should be understood that various modifications may be made without departing from the spirit and scope of the invention and that different designs may be produced under the principle of this invention. I intend the claims appended hereto to be broad enough to cover entirely the invention as shown in the drawings and all designs and modifications in which the principle of the invention may be embodied.

I claim as my invention:

1. In an airplane the combination of: a main structure; a water landing-gear movable relative to said main structure; a land landing-gear movable relative to said main structure, said land and said water landing-gears being relatively movable; and means for moving said water landing-gear into alighting position and said land landing-gear from alighting position and vice versa.

2. A combination as defined in claim 1 in which said land landing-gear is attached to and is moved into and from alighting position by said water landing-gear.

3. A combination as defined in claim 17 in which said means for moving said water landing-gear comprises: an arm connected to said water landing-gear; a lead-screw for operating said arm; and means for operating said lead-screw.

4. In an airplane adapted to alight and arise from either land or water the combination of: a main structure, a water landing-gear carried by said main structure; a land landing-gear connected to said main structure; means for moving said water landing-gear from retracted into alighting position, and means operatively connecting said water landing-gear and said land landing-gear in a manner to move said land landing-gear completely above the surface of said water as said water landing-gear is advanced into alighting position.

5. In an airplane the combination of: a main structure; a water landing-gear adapted to move between alighting position and retracted position; means for moving said water landing-gear from alighting position into retracted position and vice versa; a frame structure located on each side of said water landing-gear, said frame structures forming a portion of a land landing-gear adapted to move between alighting and retracted positions; and means connecting said land landing-gear to said main structure and cooperating with said frame structures to move said land landing-gear to alighting position when said water landing-gear is moved to retracted position and vice versa.

6. In an airplane the combination of: a main structure; a water landing-gear movably carried by said main structure; a land landing-gear carried by said water landing-gear and movable relative thereto; struts connecting said land landing-gear and said main structure, said struts guiding said land landing-gear from retracted position into alighting position as said water landing-gear is moved from alighting position into retracted position.

7. A combination as defined in claim 6 in which said struts include shock absorbers.

8. A combination as defined in claim 6 in which said land landing-gear is pivoted to said water landing-gear.

9. A combination as defined in claim 6 in which said land landing-gear is pivoted to said water landing-gear on an axis substantially parallel to the direction of flight of said airplane.

10. A combination as defined in claim 6 in which said struts are secured to arms extending from the fuselage of said airplane.

11. In an amphibian airplane the combination of: a main structure including a fuselage; pontoon carriers pivoted to said fuselage; a pontoon pivoted to said pontoon carriers; means for controlling the position of said pontoon relative to said fuselage; frames on either side of said pontoon; wheels carried by said frames; and means connecting said frames and said fuselage for extending said wheels in alighting position when said pontoon is moved into a retracted position.

12. In an amphibian airplane the combination of: a main structure including a fuselage; pontoon carriers pivoted to said fuselage; a pontoon pivoted to said pontoon carriers; means for controlling the position of said pontoon relative to said fuselage; frames pivoted on either side of said pontoon; wheels carried by said frames; and struts connecting said frames and said main structure whereby said wheels are moved into alighting position as said pontoon is moved into a retracted position.

13. In an amphibian airplane the combination of: a main structure including a fuselage; pontoon carriers pivoted to said fuselage; a pontoon pivoted to said pontoon carriers; means for controlling the position of said pontoon relative to said fuselage; frames pivoted on either side of said pontoon; wheels carried by said frames; arms extending from said fuselage; and struts connecting said arms and said frames in a manner to swing said wheels into retracted position when said pontoon is moved into alighting position and vice versa.

14. In an amphibian airplane, the combination of: a fuselage; a water landing-gear movable toward and away from said fuselage; a land landing-gear movable toward and away from said fuselage and movable relative to said water landing-gear; and means for simultaneously raising said land landing-gear and lowering said water landing-gear in a manner tending to prevent a vertical movement of the center of gravity of said airplane during the relative movement of said landing-gears.

15. In an amphibian airplane, the combination of: a fuselage; a pontoon movable downward and forward from said fuselage; a frame structure longitudinally pivoted to each side of said pontoon; wheels carried by said frame structure; shock-absorbing struts secured to said frame structure near said wheels; and means for securing said struts to said fuselage, said struts moving said wheels and said frame structures into retracted position as said pontoon is moved downward into alighting position.

16. In an amphibian airplane, the combination of: a main structure; a water landing-gear movable downward and forward from a retracted position adjacent said main structure to an alighting position; a land landing-gear movable between alighting position and retracted position, said land landing-gear being movable relative to said water landing-gear; and means operated by the movement of said water landing-gear to move said land landing-gear to retracted position when said water landing-gear moves to alighting position, and vice versa.

17. In an amphibian airplane, the combination of: a main structure; a water landing-gear carried by said main structure and movable relative thereto; means for moving said water landing-gear between retracted and alighting positions; a land landing-gear connected to said main structure and movable between retracted and alighting positions; and linkage means connecting said water landing-gear and said land landing-gear for moving said land landing-gear into alighting position when said water landing-gear is moved to retracted position, and vice versa.

18. In an airplane, the combination of: a main structure; a member movable below said main structure; a frame pivotally secured at a primary point to said member; a wheel carried by said frame; a strut pivoted to said frame at a secondary point and pivoted to said main structure about a tertiary point; and means for moving said member in a direction such that the distance between said primary point and said tertiary point is increased and said secondary point is moved above said primary point.

19. In an amphibian airplane, the combination of: a main structure; a pontoon movable below said main structure; a frame pivoted at a primary point to said pontoon; a wheel carried by said frame; a strut pivoted to said frame at a secondary point and pivoted to said main structure about a tertiary point; and means for moving said pontoon in a direction such that the distance between said primary point and said tertiary point is increased and said secondary point is moved above said primary point.

In testimony whereof, I have hereunto set my hand at Los Angeles, California, this 15th day of April, 1927.

DONALD WILLS DOUGLAS.